US012596715B2

(12) United States Patent 
Feng et al.

(10) Patent No.: US 12,596,715 B2 
(45) Date of Patent: Apr. 7, 2026

(54) DATA QUERY METHOD AND APPARATUS, AND STORAGE MEDIUM

(71) Applicant: Beijing Volcano Engine Technology Co., Ltd., Beijing (CN)

(72) Inventors: Zhengshu Feng, Beijing (CN); Lingmin Lin, Beijing (CN); Yiming Luo, Beijing (CN); Meiliang Dai, Beijing (CN); Shuyue Pang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/956,801

(22) Filed: Nov. 22, 2024

(65) Prior Publication Data

US 2025/0190436 A1 Jun. 12, 2025

(30) Foreign Application Priority Data

Dec. 11, 2023 (CN) .......................... 202311695289.9

(51) Int. Cl. 
*G06F 16/2453* (2019.01) 
*G06F 11/34* (2006.01) 
*G06F 16/245* (2019.01)

(52) U.S. Cl. 
CPC .... *G06F 16/24549* (2019.01); *G06F 11/3409* (2013.01); *G06F 16/24569* (2019.01)

(58) Field of Classification Search 
CPC .......... G06F 16/24549; G06F 11/3409; G06F 16/24569 
See application file for complete search history.

(56) References Cited

U.S. PATENT DOCUMENTS

| | | | |
|---|---|---|---|
| 6,732,084 B1 * | 5/2004 | Kabra | G06F 16/24565 |
| 11,429,629 B1 * | 8/2022 | Pedapati | G06F 16/248 |

(Continued)

FOREIGN PATENT DOCUMENTS

| | | |
|---|---|---|
| CN | 100465953 C | 3/2009 |
| CN | 104133867 A | 11/2014 |

(Continued)

OTHER PUBLICATIONS

China National Intellectual Property Administration, Notice of Allowance Issued in Application No. 202311695289.9, Nov. 28, 2025, 6 pages.

*Primary Examiner* — Khanh B Pham 
*Assistant Examiner* — Kweku William Halm 
(74) *Attorney, Agent, or Firm* — Alleman Hall LLP

(57) ABSTRACT

The present application discloses a data query method, including: obtaining a query requirement, wherein the query requirement includes an index parameter used for querying and a target parameter queried based on the index parameter; matching the index parameter and the target parameter with a pre-established correspondence respectively, to determine a to-be-queried storage file, wherein the correspondence is a correspondence between a parameter and a storage file that stores the parameter; obtaining at least one query solution that satisfies the query requirement based on the to-be-queried storage file, wherein each of the at least one query solution is used to indicate a storage file that needs to be queried to obtain the target parameter based on the index parameter; and executing a query solution corresponding to a minimum query overhead in the at least one query solution, to query and obtain the target parameter.

9 Claims, 4 Drawing Sheets

(56) References Cited

U.S. PATENT DOCUMENTS

| | | | | |
|---|---|---|---|---|
| 2020/0349161 A1* | 11/2020 | Siddiqui | ............... | G06N 20/10 |
| 2023/0110941 A1* | 4/2023 | Makhija | ............... | G06F 40/284 |
| | | | | 709/224 |
| 2023/0229660 A1* | 7/2023 | S | ........................ | G06F 16/2448 |
| | | | | 707/718 |
| 2023/0237058 A1 | 7/2023 | Gladwin et al. | | |
| 2025/0147862 A1* | 5/2025 | Suzuki | ..................... | G06F 8/20 |

FOREIGN PATENT DOCUMENTS

| | | | |
|---|---|---|---|
| CN | 116028528 A | 4/2023 | |
| CN | 116126891 A | 5/2023 | |
| CN | 116821140 A | 9/2023 | |

* cited by examiner

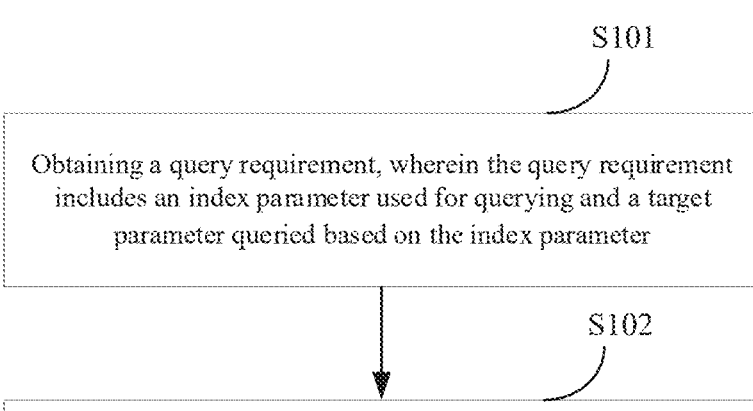

Obtaining a query requirement, wherein the query requirement includes an index parameter used for querying and a target parameter queried based on the index parameter

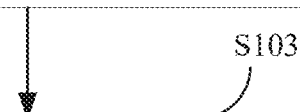

Matching the index parameter and the target parameter with a pre-established correspondence respectively, to determine a to-be-queried storage file, wherein the correspondence is a correspondence between a parameter and a storage file that stores the parameter, and the to-be-queried storage file includes a storage file that stores the index parameter and a storage file that stores the target parameter

Obtaining at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file Executing a query solution corresponding to a minimum query overhead in the at least one query solution, to query and obtain the target parameter, wherein the query overhead of each query solution is determined based on a storage system associated with the query solution, and the storage system associated with the query solution includes a storage system corresponding to a storage file involved in the query solution

FIG. 1

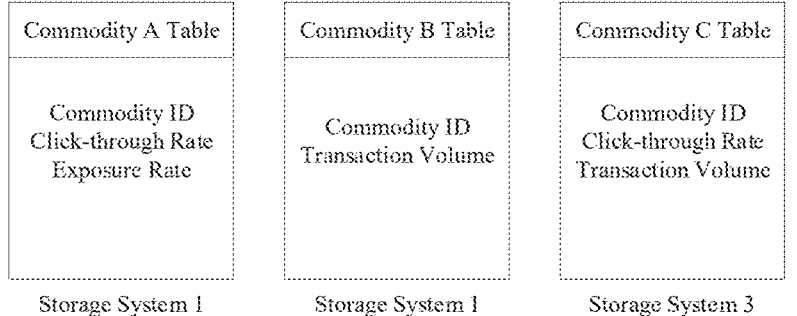
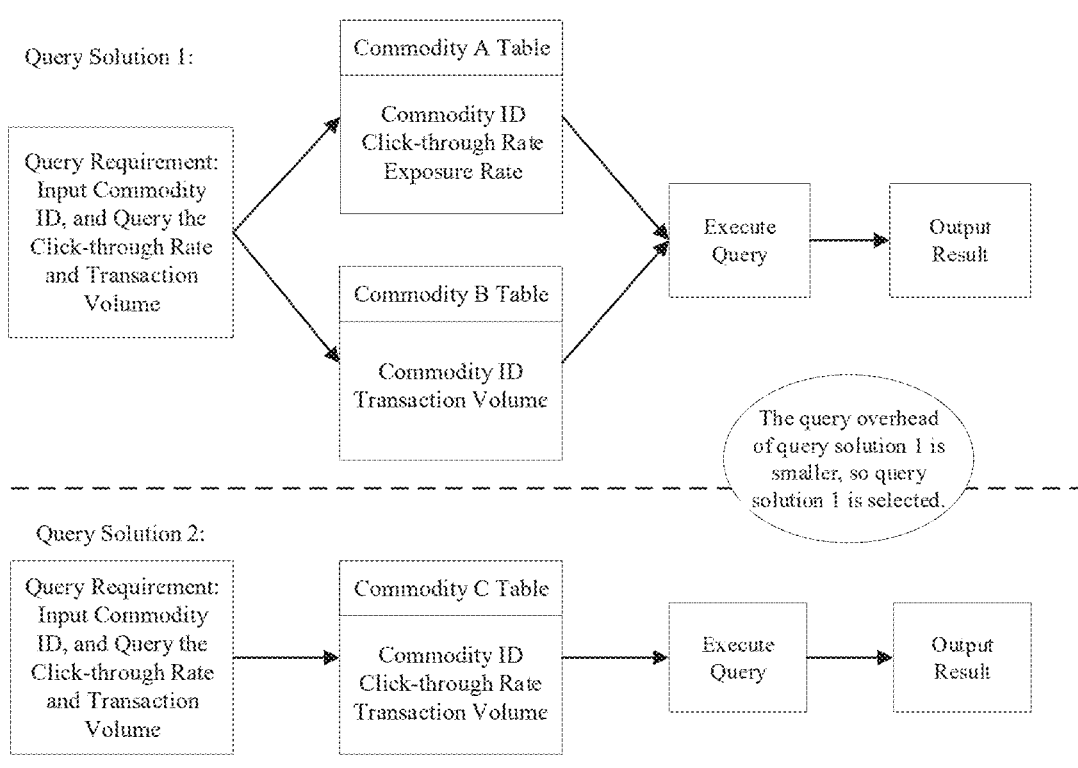
FIG. 2

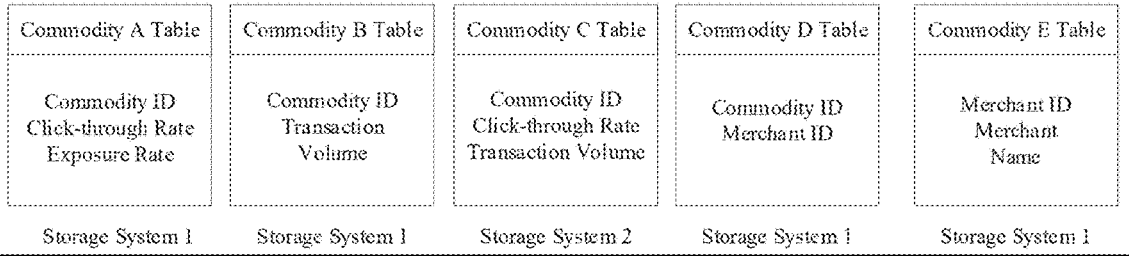

| Commodity A Table | Commodity B Table | Commodity C Table | Commodity D Table | Commodity E Table |
|---|---|---|---|---|
| Commodity ID Click-through Rate Exposure Rate | Commodity ID Transaction Volume | Commodity ID Click-through Rate Transaction Volume | Commodity ID Merchant ID | Merchant ID Merchant Name |
| Storage System 1 | Storage System 1 | Storage System 2 | Storage System 1 | Storage System 1 |

Query Requirement: Input Commodity ID, and Query the Click-through Rate, Transaction Volume And Merchant Name Query Solution 1:

Commodity A Table
Commodity ID Click-through Rate Exposure Rate

Query Requirement: Input Commodity ID, and Query the Click-through Rate and Transaction Volume Commodity B Table
Commodity ID Transaction Volume Commodity D Table
Commodity ID Merchant ID Execute Query Output Result 1

Combined

Intermediate Parameter (Merchant Name)

Output Result 2

Commodity E Table
Merchant ID Merchant Name

Execute Query

The query overhead of query solution 1 is smaller, so query solution 1 is selected.

Query Solution 2:

Commodity C Table
Commodity ID Click-through Rate Transaction Volume

Query Requirement: Input Commodity ID, and Query the Click-through Rate and Transaction Volume Commodity D Table
Commodity ID Merchant ID Execute Query Output Result 1

Combined

Intermediate Parameter (Merchant Name)

Output Result 2

Commodity E Table
Merchant ID Merchant Name

Execute Query

FIG. 3

DATA QUERY METHOD AND APPARATUS, AND STORAGE MEDIUM

CROSS-REFERENCE TO RELATED APPLICATION

This application claims the priority to and benefits of the Chinese Patent Application No. 202311695289.9, which was filed on Dec. 11, 2023. The aforementioned patent application is hereby incorporated by reference in its entirety.

TECHNICAL FIELD

The present application relates to the field of data processing, and in particular, to a data query method and apparatus.

BACKGROUND

With the development of computer technologies, there are more and more data, and accordingly, there are more and more data storage technologies. After data is generated, the data storage technologies may be used to store the data in a corresponding data storage system. In a subsequent data analysis stage, corresponding data may be queried from the data storage system as required.

With an increasingly rich functionality of a service system, there are more and more types of service data. Different types of service data may be applicable to different data storage technologies. Therefore, for a service system, service data generated by the service system may be distributed and stored in a plurality of different types of storage systems.

Currently, when data generated by a service system is distributed and stored in a plurality of different types of storage systems, efficiency of querying data from the plurality of storage systems is low. Therefore, a solution is urgently needed to solve the above problem.

SUMMARY

To solve or at least partially solve the above technical problem, embodiments of the present application provide a data query method and apparatus.

In a first aspect, an embodiment of the present application provides a data query method, the method including:

obtaining a query requirement, wherein the query requirement includes an index parameter used for querying and a target parameter queried based on the index parameter;

matching the index parameter and the target parameter with a pre-established correspondence respectively, to determine a to-be-queried storage file, wherein the correspondence is a correspondence between a parameter and a storage file that stores the parameter, and the to-be-queried storage file includes a storage file that stores the index parameter and a storage file that stores the target parameter;

obtaining at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file; and executing a query solution corresponding to a minimum query overhead in the at least one query solution, to query and obtain the target parameter, wherein the query overhead of each query solution is determined based on a storage system associated with the query solution, and the storage system associated with the query solution includes a storage system corresponding to a storage file involved in the query solution.

In a second aspect, an embodiment of the present application provides a data query apparatus, the apparatus including:

an obtaining unit, configured to obtain a query requirement, wherein the query requirement includes an index parameter used for querying and a target parameter queried based on the index parameter;

a matching unit, configured to match the index parameter and the target parameter with a pre-established correspondence respectively, to determine a to-be-queried storage file, wherein the correspondence is a correspondence between a parameter and a storage file that stores the parameter, and the to-be-queried storage file includes a storage file that stores the index parameter and a storage file that stores the target parameter;

a first determination unit, configured to obtain at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file; and a query unit, configured to execute a query solution corresponding to a minimum query overhead in the at least one query solution, to query and obtain the target parameter, wherein the query overhead of each query solution is determined based on a storage system associated with the query solution, and the storage system associated with the query solution includes a storage system corresponding to a storage file involved in the query solution.

In a third aspect, an embodiment of the present application provides an electronic device, the device including a processor and a memory, wherein the processor is configured to execute instructions stored in the memory, so that the device executes the method according to any one of the first aspect and the foregoing optional implementations of the first aspect.

In a fourth aspect, an embodiment of the present application provides a computer-readable storage medium, including instructions that instruct a device to execute the method according to any one of the first aspect and the foregoing optional implementations of the first aspect.

In a fifth aspect, an embodiment of the present application provides a computer program product that, when run on a computer, causes the computer to execute the method according to any one of the first aspect and the foregoing optional implementations of the first aspect.

BRIEF DESCRIPTION OF DRAWINGS

In order to more clearly describe the technical solutions in the embodiments of the present application or in the prior art, the following briefly describes the accompanying drawings used in describing the embodiments or the prior art. It is clear that the accompanying drawings in the following description show merely some embodiments of the present application, and persons of ordinary skill in the art may still derive other drawings from these accompanying drawings without creative efforts.

FIG. 1 is a schematic flowchart of a data query method according to an embodiment of the present application;

FIG. 2 is a schematic diagram of an example application scenario according to an embodiment of the present application;

FIG. 3 is a schematic diagram of another example application scenario according to an embodiment of the present application.

DETAILED DESCRIPTION

Figure 4:
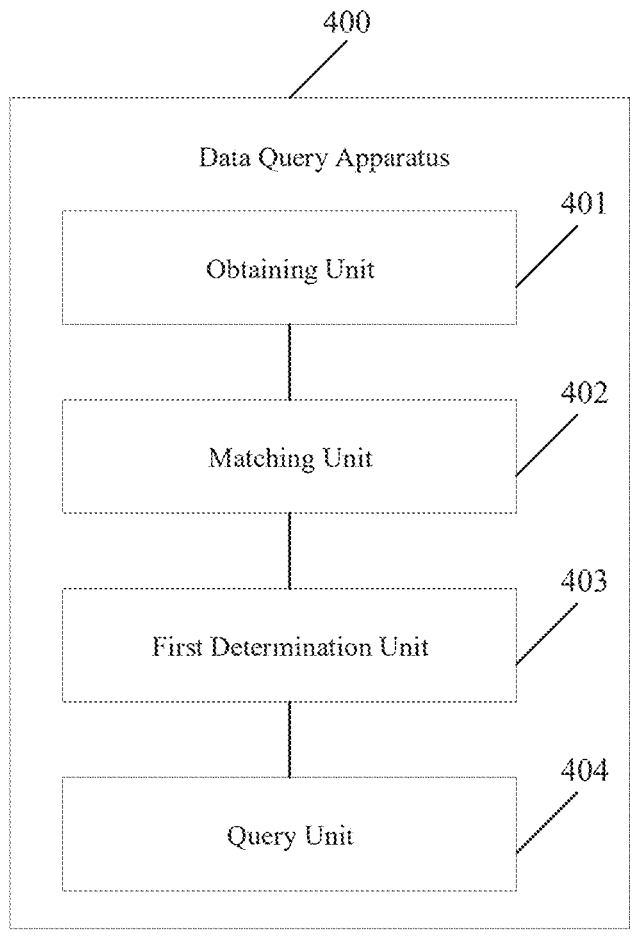
FIG. 4 is a schematic diagram of a structure of a data query apparatus according to an embodiment of the present application.

In order that those skilled in the art better understand the solutions of the present application, the technical solutions in the embodiments of the present application will be described clearly and completely with reference to the accompanying drawings in the embodiments of the present application. It is clear that the described embodiments are merely some but not all of the embodiments of the present application. All other embodiments obtained by persons of ordinary skill in the art based on the embodiments of the present application without creative efforts shall fall within the protection scope of the present application.

The inventors of the present application have found through research that when data generated by a service system is distributed and stored in a plurality of storage systems, efficiency of querying data (for example, a parameter) from the plurality of storage systems is low. This is because different storage systems support different query manners. A difference between the query manners may be reflected in a difference in a format of a query statement.

Currently, when data (for example, a parameter) needs to be queried, a user (for example, a developer or an operation and maintenance person) may first determine, in a manual confirmation manner, in which storage file corresponding to which storage system the parameter is stored, to further write a query statement applicable to the storage file, and query the parameter based on the query statement. Moreover, for a parameter, considering that the parameter may be applied to different data analysis scenarios, the parameter may be stored in a plurality of storage systems.

However, in this manner, query efficiency seriously depends on a familiarity degree of the user with a storage system corresponding to the service system. However, in actual application, it is difficult for the user to be familiar with all storage files that store various parameters, which results in a long time consumption of the foregoing process of "determine, in a manual confirmation manner, in which storage file corresponding to which storage system the parameter is stored, to further write a query statement applicable to the storage file", and accordingly, results in low efficiency of querying data.

Moreover, for a query requirement, when a plurality of query solutions exist, in the conventional art, one query solution is often randomly selected from the plurality of query solutions, and query overhead of the randomly selected query solution may be relatively large. In other words, in the conventional art, not only is data query efficiency low, but also data query overhead is relatively large.

To solve the above problems, an embodiment of the present application provides a data query method and apparatus.

Various non-limiting implementations of the present application are described in detail below with reference to the accompanying drawings.
Exemplary Method FIG. 1 is a schematic flowchart of a data query method according to an embodiment of the present application. The data query method provided in this embodiment of the present application may be applied to a server or a client, which is not specifically limited in this embodiment of the present application.

In this embodiment, the method may include, for example, the following steps: S101 to S104.

S101: obtaining a query requirement, wherein the query requirement includes an index parameter used for querying and a target parameter queried based on the index parameter.

In the embodiment of the present application, the query requirement may be input by a user. As an example, a data query page includes a query requirement input area, and the user may input the query requirement in the query requirement input area.

In the embodiment of the present application, the query requirement may include the index parameter used for querying and the target parameter queried based on the index parameter. As an example, the query requirement may be described in a natural language. In other words, the user may input, in the foregoing query requirement input area, the query requirement described in the natural language, without the need to follow software code specifications. For example, the query requirement may be: input a commodity identifier (ID), and query a commodity click-through rate and a supplier of the commodity.

S102: matching the index parameter and the target parameter with a pre-established correspondence respectively, to determine a to-be-queried storage file, wherein the correspondence is a correspondence between a parameter and a storage file that stores the parameter, and the to-be-queried storage file includes a storage file that stores the index parameter and a storage file that stores the target parameter.

After the query requirement is obtained, the to-be-queried storage file that can satisfy the query requirement may be determined in combination with the pre-established correspondence, so that query is performed subsequently by using the to-be-queried storage file.

In the embodiment of the present application, the correspondence is a correspondence between a parameter and a storage file that stores the parameter. For example, in a data storage stage, a storage file that stores the parameter may be recorded, and a correspondence between the parameter and the storage file that stores the parameter is further saved.

In an example, the correspondence between the parameter and the storage file that stores the parameter may be a correspondence between an identifier of the parameter and an identifier of the storage file. For example, the identifier of the parameter may be a parameter name, and the identifier of the storage file may include two parts: one part is a storage system to which the storage file belongs, and the other part is a name of the storage file.

In the embodiment of the present application, the index parameter and the target parameter may be matched with the pre-established correspondence respectively, to determine the to-be-queried storage file. It is easy to understand that matching the index parameter with the foregoing correspondence may determine the storage file that stores the index parameter. Matching the target parameter with the foregoing correspondence may determine the storage file that stores the target parameter. The to-be-queried storage file may include the storage file that stores the index parameter and the storage file that stores the target parameter. The storage file that stores the target parameter and the storage file that stores the index parameter may be the same or different. This is not specifically limited in the embodiment of the present application.

In an example, the foregoing to-be-queried storage file may include a plurality of storage files, and each of the plurality of storage files stores both the index parameter and the query parameter.

In another example, when the foregoing target parameter includes a plurality of parameters, a storage file may include the index parameter and part or all of the plurality of parameters. For example, the target parameter includes a first parameter and a second parameter. In an example, the foregoing to-be-queried storage file may include a first storage file, a second storage file, and a third storage file. The first storage file stores the index parameter and the first parameter, and the second storage file stores the index parameter and the second parameter. The third storage file stores the index parameter, the first parameter, and the second parameter.

In another example, the storage file that stores the index parameter and the storage file that stores the target parameter may be different storage files. In a specific example, the target parameter includes a third parameter, and the to-be-queried storage file includes a fourth storage file and a fifth storage file. The fourth storage file stores the index parameter, and the fifth storage file stores the third parameter. In addition, the fourth storage file further stores an intermediate parameter in addition to storing the index parameter, and accordingly, the fifth storage file further stores the intermediate parameter in addition to storing the third parameter. The intermediate parameter may be used as a bridge connecting the index parameter and the third parameter.

S103: obtaining at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file.

After the to-be-queried storage file is determined, a query solution that satisfies the query requirement may be determined based on the to-be-queried storage file. As described above, for a parameter, considering that the parameter may be applied to different data analysis scenarios, the parameter may be stored in a plurality of storage systems. Therefore, at least one query solution that satisfies the query requirement may be determined based on the to-be-queried storage file.

For each of the at least one query solution, the query solution may be used to indicate a to-be-queried storage file to achieve the query requirement, that is, the query solution may be used to indicate a storage file that needs to be queried to obtain the target parameter based on the index parameter. For any query solution, the storage file indicated by the query solution may be part or all of the storage files included in the foregoing to-be-queried storage file. For any query solution, the query solution may include three elements: a query input, a query file, and a query result.

As described in S102, in an example, the foregoing to-be-queried storage file may include a plurality of storage files that each store both the index parameter and the target parameter. In this case, one query solution may be determined respectively based on each of the plurality of storage files. In this scenario, the query input of each query solution is the index parameter, the query file is the storage file, and the query result is the target parameter.

For example, a query requirement is to input a commodity ID to query a commodity click-through rate. Moreover, both the commodity ID and the commodity click-through rate are stored in a storage file A1 of a storage system A, and both the commodity ID and the commodity click-through rate are stored in a storage file B1 of a storage system B. Therefore, a query solution 1 may be determined as: query the storage file A1 of the storage system A. A query solution 2 is: query the storage file B1 of the storage system B.

As described in S102, in another example, the foregoing to-be-queried storage file may include a first storage file, a second storage file, and a third storage file. In this case, a first query solution and a second query solution may be determined based on the first storage file, the second storage file, and the third storage file. Specifically, the first query solution may be determined based on the first storage file and the second storage file, where the first query solution is used to indicate to query and obtain the target parameter based on the first storage file and the second storage file. Specifically, the first query solution is used to indicate to query and obtain the first parameter based on the first storage file, and query and obtain the second parameter based on the second storage file. The second query solution is used to indicate to query and obtain the first parameter and the second parameter based on the third storage file.

As described in S102, in another example, the foregoing to-be-queried storage file includes a fourth storage file and a fifth storage file. In this case, a fourth query solution may be obtained based on the fourth storage file and the fifth storage file. Specifically, a query order of the fourth storage file and the fifth query file may be determined based on a dependency relationship among the index parameter, the intermediate parameter, and the third parameter, to obtain the fourth query solution that can reflect the query order and can achieve the query requirement. Specifically, the fourth query solution may be used to indicate to first query the fourth storage file based on the index parameter, and then query the fifth storage file based on the intermediate parameter obtained by querying the fourth storage file, to obtain the third parameter. It is easy to understand that the fourth query solution includes two query links that are sequentially executed. The first query link is to query the fourth storage file based on the index parameter, to obtain the intermediate parameter. Query input of the first query link is the index parameter, the query file is the fourth storage file, and the query result is the intermediate parameter. The second query link is to query the fifth storage file based on the intermediate parameter, to obtain the third parameter. Query input of the second query link is the intermediate parameter, the query file is the fifth storage file, and the query result is the third parameter.

S104: executing a query solution corresponding to a minimum query overhead in the at least one query solution, to query and obtain the target parameter, wherein the query overhead of each query solution is determined based on a storage system associated with the query solution, and the storage system associated with the query solution includes a storage system corresponding to a storage file involved in the query solution.

After the at least one query solution is determined, in order to minimize query overhead used for querying and obtaining the target parameter as much as possible, the query solution corresponding to the minimum query overhead in the at least one query solution may be executed, to query and obtain the target parameter.

In an example, when the query solution corresponding to the minimum query overhead is executed, in a specific implementation, the query solution corresponding to the minimum query overhead may be output, a query statement corresponding to the query solution is written manually in a query statement writing manner, and the query statement is further run. In another example, the query statement corresponding to the query solution corresponding to the minimum query overhead may be automatically generated and executed, to query and obtain the target parameter. When the query statement is automatically generated, in a specific implementation, the storage file involved in the query solution may be first determined, and then, for each storage file, a query statement corresponding to each storage file is generated based on three elements of the storage file (namely, the query input, the query file, and the query result foregoing described) and a query statement format supported by the storage file. Correspondingly, when the query statement corresponding to each storage file is executed, a corresponding query statement may be executed in combination with a query order of each storage file.

In an example, before S104 is performed, query overheads respectively corresponding to the query solutions in the at least one query solution may also be determined, and then the query overheads respectively corresponding to the query solutions are compared, so that the query solution corresponding to the minimum query overhead in the at least one query solution is determined.

In the embodiment of the present application, the query overhead of each query solution may be determined based on a storage system associated with the query solution. As described above, each query solution may be used to indicate a storage file that needs to be queried to obtain the target parameter based on the index parameter, and the storage file is stored in a storage system. Therefore, the storage system associated with the query solution may be a storage system corresponding to the storage file involved in the query solution. The storage file involved in the query solution may be a storage file that the query solution indicates need to be queried. The storage system corresponding to the storage file refers to a storage system that stores the storage file.

In an example, a query solution may be associated with at least one storage system. As an example, when storage files involved in the query solution all belong to a first storage system, the storage system associated with the query solution may be the first storage system. As another example, when the storage files involved in the query solution corresponds to a plurality of storage systems, the storage system associated with the query solution may include the plurality of storage systems. For example, the query solution indicates to query a storage file 1 and a storage file 2, the storage file 1 belongs to a first storage system, and the storage file 2 belongs to a second storage system. Therefore, the storage system associated with the query solution may include the first storage system and the second storage system.

In an example, the at least one query solution may be output, and query overhead of each of the at least one query solution may be determined in a manual analysis manner.

In another example, for any query solution in the at least one query solution, a query overhead corresponding to the query solution may be determined based on a query overhead value of a storage file involved in the query solution, wherein the storage file involved in the query solution refers to the storage file that needs to be queried to obtain the target parameter based on the index parameter indicated by the query solution. The overhead value of the storage file may be used to indicate overhead required for querying the storage file.

In a specific example, if the query solution involves one storage file, the query overhead value of the one storage file may be determined as the query overhead corresponding to the query solution. In another specific example, if the query solution involves a plurality of storage files, a sum of query overhead values of the plurality of storage files may be determined as the query overhead corresponding to the query solution.

For ease of description, any storage file involved in the query solution is referred to as a "target storage file". It is easy to understand that the target storage file may be the first storage file, the second storage file, the third storage file, the fourth storage file, or the fifth storage file described above. In the embodiment of the present application, the query overhead value of the target storage file may be determined based on the storage system corresponding to the target storage file.

In an example, the query overhead value of the target storage file may be an empirical value, and the empirical value may be set based on the storage system corresponding to the target storage file.

In another example, the target storage file may include at least one dimension of indicator, and the indicator may be a indicator related to query overhead. In this case, the query overhead value of the target storage file may be determined based on a statistical value corresponding to the at least one dimension of indicator and a weight respectively corresponding to each of the at least one dimension of indicator. For example, for any indicator, a product of a statistical value corresponding to the indicator and a weight of the indicator may be calculated, to obtain a query overhead value corresponding to the indicator, and then query overhead values corresponding to the indicators are summed, to obtain the query overhead value of the target storage file.

In this embodiment of the present application, the weight respectively corresponding to each of the at least one dimension of indicator may be determined based on the storage system corresponding to the target storage file. For the same indicator, as query performances of different storage systems are different, weight values of the indicator corresponding to the different storage systems are also different.

The indicator is not specifically limited in the embodiment of the present application, and the indicator includes but is not limited to the following indicators: a query concurrency, a query duration, a query accuracy, a selected number of times, a storage cost, and the like. Next, a query overhead of the target storage file will be described with reference to the following Table 1.

TABLE 1

| Indicator | Statistical value | Weight | Query overhead value |
|---|---|---|---|
| Query concurrency | 0.1 | 100 | 10 |
| Query duration | 0.5 | −50 | −25 |
| Query accuracy | 1 | 1000 | 1000 |
| Number of selected times | 0.1 | 100 | 10 |
| Storage cost | 0.5 | −100 | −50 |

According to Table 1, the query overhead values corresponding to the indicators are summed, to obtain that the query overhead value of the target file is 945.

It can be learned from the foregoing description that, by using the solution in the embodiment of the present application, a storage file that stores the target parameter does not need to be manually sorted to determine a query solution, and instead, the to-be-queried storage file may be determined based on the foregoing correspondence, and accordingly, at least one query solution is determined based on the to-be-queried storage file, thereby improving efficiency of determining the query solution. After the at least one query solution is obtained, in order to minimize query overhead as much as possible on the premise of achieving a query purpose, a query solution corresponding to a minimum query overhead in the at least one query solution may be executed, to query and obtain the target parameter. In conclusion, by using the solution in the embodiment of the present application, query efficiency can be improved, and query overhead can be saved.

The data query method provided in the embodiment of the present application is described above. Next, the data query method provided in the embodiment of the present application is described with reference to a specific scenario. In the following scenario, a storage file is described as an example of a data table.

FIG. 2 is a schematic diagram of an example application scenario according to an embodiment of the present application.

As shown in FIG. 2, a storage system 1 stores a commodity A table and a commodity B table, where the commodity A table correspondingly stores a commodity ID, a click-through rate, and an exposure rate, and the commodity B table correspondingly stores the commodity ID and a transaction volume. A storage system 2 stores a commodity C table, wherein the commodity C table correspondingly stores the commodity ID, the click-through rate, and a transaction volume.

A query requirement is to: input the commodity ID, and query the click-through rate and the transaction volume.

The commodity A table, the commodity B table, and the commodity C table are queried based on the commodity ID, the click-through rate, and the transaction volume, to obtain two query solutions shown in FIG. 2.

Query solution 1: Query the click-through rate from the commodity A table based on the commodity ID, and query the transaction volume from the commodity B table based on the commodity ID.

Query solution 2: Query the click-through rate and the transaction volume from the commodity C table based on the commodity ID.

Query overheads of query solution 1 and query solution 2 are calculated. A calculation result indicates that the query overhead of query solution 1 is less than the query overhead of query solution 2. Therefore, query solution 1 may be executed to obtain a corresponding query result.

FIG. 3 is a schematic diagram of another example application scenario according to an embodiment of the present application.

As shown in FIG. 3, a storage system 1 stores a commodity A table and a commodity B table, where the commodity A table correspondingly stores a commodity ID, a click-through rate, and an exposure rate, and the commodity B table correspondingly stores the commodity ID and a transaction volume. A storage system 2 stores a commodity C table, where the commodity C table correspondingly stores the commodity ID, the click-through rate, and a transaction volume. In addition, the storage system 1 further stores a commodity D table and a commodity E table, where the commodity D table correspondingly stores the commodity ID and a merchant ID, and the commodity E table correspondingly stores the merchant ID and a merchant name.

A query requirement is to: input the commodity ID, and query the click-through rate, the transaction volume, and the merchant name.

The commodity A table, the commodity B table, the commodity C table, the commodity D table, and the commodity E table are queried based on the commodity ID, the click-through rate, and the transaction volume, to obtain two query solutions shown in FIG. 3.

Query solution 1: Query the click-through rate from the commodity A table based on the commodity ID, and query the transaction volume from the commodity B table based on the commodity ID (the click-through rate and the transaction volume correspond to output result 1 shown in FIG. 3). In addition, the merchant ID is first queried from the commodity D table based on the commodity ID, and then the merchant name is queried from the commodity E table based on the merchant ID (corresponding to output result 2 shown in FIG. 3). Finally, output result 1 and output result 2 are combined to obtain a final output result.

Query solution 2: Query the click-through rate and the transaction volume from the commodity C table based on the commodity ID (corresponding to output result 1 shown in FIG. 3). In addition, the merchant ID is first queried from the commodity D table based on the commodity ID, and then the merchant name is queried from the commodity E table based on the merchant ID (corresponding to output result 2 shown in FIG. 3). Finally, output result 1 and output result 2 are combined to obtain a final output result.

Query overheads of query solution 1 and query solution 2 are calculated. A calculation result indicates that the query overhead of query solution 1 is less than the query overhead of query solution 2. Therefore, query solution 1 may be executed to obtain a corresponding query result.

An embodiment of the present application provides a data query method, including: obtaining a query requirement, wherein the query requirement includes an index parameter used for querying and a target parameter queried based on the index parameter. In the embodiment of the present application, a to-be-queried storage file may be determined in combination with a pre-established correspondence between a parameter and a storage file that stores the parameter. Specifically, the index parameter and the target parameter may be matched with a pre-established correspondence respectively, to determine the to-be-queried storage file, wherein the to-be-queried storage file may include a storage file that stores the index parameter and a storage file that stores the target parameter. After the to-be-queried storage file is determined, at least one query solution that satisfies the query requirement may be obtained based on the to-be-queried storage file, wherein each of the at least one query solution is used to indicate a storage file that needs to be queried to obtain the target parameter based on the index parameter, and for a query solution, a storage file involved in the query solution may be part or all of the storage files included in the to-be-queried storage file. The storage file involved in the query solution refers to the storage file that needs to be queried to obtain the target parameter based on the index parameter indicated by the query solution. It can be seen that, by using the solution in the embodiment of the present application, a storage file that stores the target parameter does not need to be manually sorted to determine a query solution, and instead, the to-be-queried storage file may be determined based on the foregoing correspondence, and accordingly, at least one query solution is determined based on the to-be-queried storage file, thereby the efficiency of determining the query solution is improved. After the at least one query solution is obtained, in order to minimize query overhead as much as possible on the premise of achieving a query purpose, a query solution corresponding to a minimum query overhead in the at least one query solution may be executed, to query and obtain the target parameter. However, as query performances of different storage systems are different, query overheads required for querying storage files in different storage systems are also different. In the embodiment of the present application, the query overhead of each query solution is determined based on a storage system associated with the query solution, and the storage system associated with the query solution includes a storage system corresponding to a storage file involved in the query solution. In other words, by using this solution, the query overhead of the query solution may be determined in combination with the query performance of the storage system, so that the query solution with a minimum query overhead is selected. In conclusion, by using the solution in the embodiment of the present application, when service data is distributed and stored in a plurality of storage systems, query efficiency can be improved, and query overhead can be saved.

Exemplary Apparatus

Based on the method provided in the foregoing embodiment, this embodiment of the present application further provides an apparatus. The apparatus is described below with reference to the accompanying drawings.

FIG. 4 is a schematic diagram of a structure of a data query apparatus according to an embodiment of the present application. The apparatus 400 may specifically include, for example: an obtaining unit 401, a matching unit 402, a first determination unit 403, and a query unit 404.

The obtaining unit 401 is configured to obtain a query requirement, wherein the query requirement includes an index parameter used for querying and a target parameter queried based on the index parameter.

The matching unit 402 is configured to match the index parameter and the target parameter with a pre-established correspondence respectively, to determine a to-be-queried storage file, wherein the correspondence is a correspondence between a parameter and a storage file that stores the parameter, and the to-be-queried storage file includes a storage file that stores the index parameter and a storage file that stores the target parameter.

The first determination unit 403 is configured to obtain at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file.

The query unit 404 is configured to execute a query solution corresponding to a minimum query overhead in the at least one query solution, to query and obtain the target parameter, wherein the query overhead of each query solution is determined based on a storage system associated with the query solution, and the storage system associated with the query solution includes a storage system corresponding to a storage file involved in the query solution.

Optionally, the matching unit 402 is configured to:

match the index parameter and the target parameter with a pre-established correspondence respectively, to obtain a plurality of storage files that each store both the index parameter and the target parameter, and determine the plurality of storage files as the to-be-queried storage file; and the first determination unit 403 is configured to:

determine a query solution corresponding to each of the plurality of storage files respectively.

Optionally, the target parameter includes a first parameter and a second parameter;

the matching unit 402 is configured to:

match the index parameter and the target parameter with a pre-established correspondence respectively, to obtain a first storage file, a second storage file, and a third storage file, wherein the first storage file stores the index parameter and the first parameter, the second storage file stores the index parameter and the second parameter, and the third storage file stores the index parameter, the first parameter, and the second parameter; and the first determination unit 403 is configured to:

obtain a first query solution and a second query solution based on the first storage file, the second storage file, and the third storage file, wherein the first query solution indicates to query and obtain the target parameter based on the first storage file and the second storage file, and the third query solution indicates to query and obtain the target parameter based on the third storage file.

Optionally, the target parameter includes a third parameter;

the matching unit 402 is configured to:

match the index parameter and the target parameter with a pre-established correspondence respectively, to obtain a fourth storage file that stores the index parameter and an intermediate parameter, and a fifth storage file that stores the intermediate parameter and the third parameter; and the first determination unit 403 is configured to:

obtain a fourth query solution based on the fourth storage file and the fifth storage file, wherein the fourth query solution indicates to first query the fourth storage file based on the index parameter, and then query the fifth storage file based on the intermediate parameter obtained by querying the fourth storage file, to obtain the third parameter.

Optionally, the apparatus further includes:

a second determination unit, configured to determine, for each of the at least one query solution, a query overhead corresponding to the query solution based on a query overhead value of a storage file involved in the query solution before the query unit 404 executes a query solution corresponding to a minimum query overhead in the at least one query solution, to query and obtain the target parameter, wherein the storage file involved in the query solution includes a target storage file, and the query overhead value of the target storage file is determined based on a storage system corresponding to the target storage file.

Optionally, the target storage file includes at least one dimension of indicator, and the query overhead value of the target storage file is determined based on a statistical value corresponding to the at least one dimension of indicator and a weight respectively corresponding to each of the at least one dimension of indicator, wherein the weight respectively corresponding to each of the at least one dimension of indicator is determined based on the storage system corresponding to the target storage file.

Optionally, the query unit 404 is configured to:

generate a query statement corresponding to each of storage files based on a query statement format supported by each of the storage files which are involved in the query solution and execute the query statement to query and obtain the target parameter.

As the apparatus 400 is an apparatus corresponding to the data query method provided in the foregoing method embodiment, specific implementations of the units of the apparatus 400 are all in the same concept as that of the foregoing method embodiment. Therefore, for specific implementations of the units of the apparatus 400, reference may be made to the related description part of the foregoing method embodiment, and details are not described herein again.

An embodiment of the present application further provides an electronic device, the electronic device including a processor and a memory, wherein the processor is configured to execute instructions stored in the memory, so that the device executes the data query method provided in the foregoing method embodiment.

An embodiment of the present application provides a computer-readable storage medium, including instructions that instruct a device to execute the data query method provided in the foregoing method embodiment.

An embodiment of the present application further provides a computer program product that, when running on a computer, causes the computer to execute the data query method provided in the foregoing method embodiment.

An embodiment of the present application provides a data query method, the method including:

obtaining a query requirement, wherein the query requirement includes an index parameter used for querying and a target parameter queried based on the index parameter;

matching the index parameter and the target parameter with a pre-established correspondence respectively, to determine a to-be-queried storage file, wherein the correspondence is a correspondence between a parameter and a storage file that stores the parameter, and the to-be-queried storage file includes a storage file that stores the index parameter and a storage file that stores the target parameter;

obtaining at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file; and executing a query solution corresponding to a minimum query overhead in the at least one query solution, to query and obtain the target parameter, wherein the query overhead of each query solution is determined based on a storage system associated with the query solution, and the storage system associated with the query solution includes a storage system corresponding to a storage file involved in the query solution.

Optionally, the matching the index parameter and the target parameter with a pre-established correspondence respectively, to determine a to-be-queried storage file includes:

matching the index parameter and the target parameter with a pre-established correspondence respectively, to obtain a plurality of storage files that each store both the index parameter and the target parameter, and determining the plurality of storage files as the to-be-queried storage file; and the obtaining at least one query solution that satisfies the query requirement based on the to-be-queried storage file includes:

determining a query solution corresponding to each of the plurality of storage files respectively.

Optionally, the target parameter includes a first parameter and a second parameter, and the matching the index parameter and the target parameter with a pre-established correspondence respectively, to determine a to-be-queried storage file includes:

matching the index parameter and the target parameter with a pre-established correspondence respectively, to obtain a first storage file, a second storage file, and a third storage file, wherein the first storage file stores the index parameter and the first parameter, the second storage file stores the index parameter and the second parameter, and the third storage file stores the index parameter, the first parameter, and the second parameter; and the obtaining at least one query solution that satisfies the query requirement based on the to-be-queried storage file includes:

obtaining a first query solution and a second query solution based on the first storage file, the second storage file, and the third storage file, wherein the first query solution indicates to query and obtain the target parameter based on the first storage file and the second storage file, and the third query solution indicates to query and obtain the target parameter based on the third storage file.

Optionally, the target parameter includes a third parameter, and the matching the index parameter and the target parameter with a pre-established correspondence respectively, to determine a to-be-queried storage file includes:

matching the index parameter and the target parameter with a pre-established correspondence respectively, to obtain a fourth storage file that stores the index parameter and an intermediate parameter, and a fifth storage file that stores the intermediate parameter and the third parameter; and the obtaining at least one query solution that satisfies the query requirement based on the to-be-queried storage file includes:

obtaining a fourth query solution based on the fourth storage file and the fifth storage file, wherein the fourth query solution indicates to first query the fourth storage file based on the index parameter, and then query the fifth storage file based on the intermediate parameter obtained by querying the fourth storage file, to obtain the third parameter.

Optionally, before the executing a query solution corresponding to a minimum query overhead in the at least one query solution, to query and obtain the target parameter, the method further includes:

determining, for each of the at least one query solution, a query overhead corresponding to the query solution based on a query overhead value of a storage file involved in the query solution, wherein the storage file involved in the query solution includes a target storage file, and the query overhead value of the target storage file is determined based on a storage system corresponding to the target storage file.

Optionally, the target storage file includes at least one dimension of indicator, and the query overhead value of the target storage file is determined based on a statistical value corresponding to the at least one dimension of indicator and a weight respectively corresponding to each of the at least one dimension of indicator, wherein the weight respectively corresponding to each of the at least one dimension of indicator is determined based on the storage system corresponding to the target storage file.

Optionally, the executing a query solution corresponding to a minimum query overhead in the at least one query solution, to query and obtain the target parameter includes:

generating a query statement corresponding to each of storage files based on a query statement format supported by each of the storage files which are involved in the query solution and executing the query statement to query and obtain the target parameter.

Persons skilled in the art may easily envision other embodiments of the present application after considering the specification and practicing the invention disclosed herein. The present application is intended to cover any variations, uses, or adaptive changes of the present application. Such variations, uses, or adaptive changes follow the general principles of the present application and include common knowledge or conventional technical means in the art that are not disclosed in the present disclosure. The specification and embodiments are merely regarded as examples, and the true scope and spirit of the present application are defined by the appended claims.

It should be understood that the present application is not limited to the precise structures that have been described above and shown in the accompanying drawings, and various modifications and changes may be made without departing from the scope thereof. The scope of the present application is limited only by the appended claims.

The foregoing descriptions are merely preferred embodiments of the present application, but are not intended to limit the present application. Any modification, equivalent replacement, improvement, etc. made within the spirit and principle of the present application shall fall within the protection scope of the present application.

The invention claimed is:

1. A data query method, comprising:

receiving parameters by a plurality of storage systems of different types on a computer device, wherein the parameters comprise computer data and the computer data is distributed in the plurality of storage systems, the plurality of storage systems of different types support different query manners, and a difference between the query manners comprises a difference in a format of a query statement;

obtaining a query requirement through a query page, wherein the query requirement comprises an index parameter used for querying and a target parameter queried based on the index parameter;

storing a correspondence between a parameter and a storage file that stores the parameter, and matching the index parameter and the target parameter with the correspondence respectively, to determine a to-be-queried storage file, wherein the to-be-queried storage file comprises a storage file that stores the index parameter and a storage file that stores the target parameter;

obtaining at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file; and automatically generating a query statement corresponding to a query solution corresponding to a minimum query overhead in the at least one query solution and executing the query statement to execute the query solution corresponding to the minimum query overhead, to query and obtain the target parameter, wherein the query overhead of each query solution is determined based on a storage system associated with the query solution in the plurality of storage systems, and the storage system associated with the query solution comprises a storage system corresponding to a storage file involved in the query solution, wherein the target parameter comprises a third parameter, and the storing a correspondence between a parameter and a storage file that stores the parameter, and matching the index parameter and the target parameter with the correspondence respectively, to determine a to-be-queried storage file comprises:

matching the index parameter and the target parameter with the correspondence respectively, to obtain a fourth storage file that stores the index parameter and an intermediate parameter, and a fifth storage file that stores the intermediate parameter and the third parameter, wherein the obtaining at least one query solution that satisfies the query requirement based on the to-be-queried storage file comprises:

obtaining a fourth query solution based on the fourth storage file and the fifth storage file, wherein the fourth query solution indicates to first query the fourth storage file based on the index parameter, and then query the fifth storage file based on the intermediate parameter obtained by querying the fourth storage file, to obtain the third parameter, wherein before the automatically generating a query statement corresponding to a query solution corresponding to a minimum query overhead in the at least one query solution and executing the query statement to execute the query solution corresponding to the minimum query overhead, to query and obtain the target parameter, the method further comprises:

determining, for each of the at least one query solution, a query overhead corresponding to the query solution based on a query overhead value of a storage file involved in the query solution, wherein the storage file involved in the query solution comprises a target storage file, and the query overhead value of the target storage file is determined based on a storage system corresponding to the target storage file, wherein the target storage file comprises at least one dimension of indicator, the query overhead value of the target storage file is equal to a sum of query overhead values corresponding to each indicator, and the query overhead value of each indicator is equal to a product of a statistical value corresponding to the indicator and a weight of the indicator, wherein the weight respectively corresponding to each of the at least one dimension of indicator is determined based on the storage system corresponding to the target storage file, and wherein the automatically generating a query statement corresponding to a query solution corresponding to a minimum query overhead in the at least one query solution and executing the query statement to execute the query solution corresponding to the minimum query overhead, to query and obtain the target parameter comprises:

determining storage files which are involved in the query solution;

generating the query statement corresponding to each of storage files based on each of the storage files which are involved in the query solution, query input corresponding to a storage file, query result corresponding to the storage file, and a query statement format supported by each of the storage files which are involved in the query solution, wherein the query input comprises the index parameter for querying the fourth storage file and the intermediate parameter for querying the fifth query file, and the query result comprises the intermediate parameter obtained by querying the fourth storage file and the third parameter obtained by querying the fifth query file; and executing the query statement to query based on a query order of the fourth storage file and the fifth query file and obtain the target parameter.

2. The method according to claim 1, wherein the storing a correspondence between a parameter and a storage file that stores the parameter, and matching the index parameter and the target parameter with the correspondence respectively, to determine a to-be-queried storage file further comprises:

matching the index parameter and the target parameter with the correspondence respectively, to obtain a plurality of storage files that each store both the index parameter and the target parameter, and determining the plurality of storage files as the to-be-queried storage file, and wherein the obtaining at least one query solution that satisfies the query requirement based on the to-be-queried storage file further comprises:

determining a query solution corresponding to each of the plurality of storage files respectively.

3. The method according to claim 1, wherein the target parameter comprises a first parameter and a second parameter, and storing a correspondence between a parameter and a storage file that stores the parameter, and the matching the index parameter and the target parameter with the correspondence respectively, to determine a to-be-queried storage file further comprises:

matching the index parameter and the target parameter with the correspondence respectively, to obtain a first storage file, a second storage file, and a third storage file, wherein the first storage file stores the index parameter and the first parameter, the second storage file stores the index parameter and the second parameter, and the third storage file stores the index parameter, the first parameter, and the second parameter, and wherein the obtaining at least one query solution that satisfies the query requirement based on the to-be-queried storage file further comprises:

obtaining a first query solution and a second query solution based on the first storage file, the second storage file, and the third storage file, wherein the first query solution indicates to query and obtain the target parameter based on the first storage file and the second storage file, and the third query solution indicates to query and obtain the target parameter based on the third storage file.

4. A data query apparatus, comprising:

at least one processor, and a non-transitory memory with instructions thereon, wherein the instructions upon execution by the processor, cause the processor to:

receive parameters by a plurality of storage systems of different types on a computer device, wherein the parameters comprise computer data and the computer data is distributed in the plurality of storage systems, the plurality of storage systems of different types support different query manners, and a difference between the query manners comprises a difference in a format of a query statement;

obtain a query requirement through a query page, wherein the query requirement comprises an index parameter used for querying and a target parameter queried based on the index parameter;

store a correspondence between a parameter and a storage file that stores the parameter, and match the index parameter and the target parameter with the correspondence respectively, to determine a to-be-queried storage file, wherein the to-be-queried storage file comprises a storage file that stores the index parameter and a storage file that stores the target parameter;

obtain at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file;

automatically generate a query statement corresponding to a query solution corresponding to a minimum query overhead in the at least one query solution and execute the query statement to execute the query solution corresponding to the minimum query overhead, to query and obtain the target parameter, wherein the query overhead of each query solution is determined based on a storage system associated with the query solution in the plurality of storage systems, and the storage system associated with the query solution comprises a storage system corresponding to a storage file involved in the query solution; and determine, for each of the at least one query solution, a query overhead corresponding to the query solution based on a query overhead value of a storage file involved in the query solution, wherein the storage file involved in the query solution comprises a target storage file, and the query overhead value of the target storage file is determined based on a storage system corresponding to the target storage file, wherein the target storage file comprises at least one dimension of indicator, the query overhead value of the target storage file is equal to a sum of query overhead values corresponding to each indicator, and the query overhead value of each indicator is equal to a product of a statistical value corresponding to the indicator and a weight of the indicator, wherein the weight respectively corresponding to each of the at least one dimension of indicator is determined based on the storage system corresponding to the target storage file, and wherein the target parameter comprises a third parameter, and the processor is further caused to:

match the index parameter and the target parameter with the correspondence respectively, to obtain a fourth storage file that stores the index parameter and an intermediate parameter, and a fifth storage file that stores the intermediate parameter and the third parameter;

obtain a fourth query solution based on the fourth storage file and the fifth storage file, wherein the fourth query solution indicates to first query the fourth storage file based on the index parameter, and then query the fifth storage file based on the intermediate parameter obtained by querying the fourth storage file, to obtain the third parameter;

determine storage files which are involved in the query solution;

generate the query statement corresponding to each of storage files based on each of the storage files which are involved in the query solution, query input corresponding to a storage file, query result corresponding to the storage file, and a query statement format supported by each of the storage files which are involved in the query solution, wherein the query input comprises the index parameter for querying the fourth storage file and the intermediate parameter for querying the fifth query file, and the query result comprises the intermediate parameter obtained by querying the fourth storage file and the third parameter obtained by querying the fifth query file; and execute the query statement to query based on a query order of the fourth storage file and the fifth query file and obtain the target parameter.

5. The apparatus according to claim 4, wherein the processor is further caused to:

match the index parameter and the target parameter with the correspondence respectively, to obtain a plurality of storage files that each store both the index parameter and the target parameter, and determine the plurality of storage files as the to-be-queried storage file; and determine a query solution corresponding to each of the plurality of storage files respectively.

6. The apparatus according to claim 4, wherein the target parameter comprises a first parameter and a second parameter, and the processor is further caused to:

match the index parameter and the target parameter with the correspondence respectively, to obtain a first storage file, a second storage file, and a third storage file, wherein the first storage file stores the index parameter and the first parameter, the second storage file stores the index parameter and the second parameter, and the third storage file stores the index parameter, the first parameter, and the second parameter; and obtain a first query solution and a second query solution based on the first storage file, the second storage file, and the third storage file, wherein the first query solution indicates to query and obtain the target parameter based on the first storage file and the second storage file, and the third query solution indicates to query and obtain the target parameter based on the third storage file.

7. A non-transitory computer-readable storage medium storing instructions that cause at least a processor to:

receive parameters by a plurality of storage systems of different types on a computer device, wherein the parameters comprise computer data and the computer data is distributed in the plurality of storage systems, the plurality of storage systems of different types support different query manners, and a difference between the query manners comprises a difference in a format of a query statement;

obtain a query requirement through a query page, wherein the query requirement comprises an index parameter used for querying and a target parameter queried based on the index parameter;

store a correspondence between a parameter and a storage file that stores the parameter, and match the index parameter and the target parameter with the correspondence respectively, to determine a to-be-queried storage file, wherein the to-be-queried storage file comprises a storage file that stores the index parameter and a storage file that stores the target parameter;

obtain at least one query solution that satisfies the query requirement based on the to-be-queried storage file, wherein each of the at least one query solution is used to indicate a storage file that needs to be queried to obtain the target parameter based on the index parameter, and the storage file that needs to be queried to obtain the target parameter based on the index parameter is part or all of the storage files included in the to-be-queried storage file;

automatically generate a query statement corresponding to a query solution corresponding to a minimum query overhead in the at least one query solution and execute the query statement to execute the query solution corresponding to the minimum query overhead, to query and obtain the target parameter, wherein the query overhead of each query solution is determined based on a storage system associated with the query solution in the plurality of storage systems, and the storage system associated with the query solution comprises a storage system corresponding to a storage file involved in the query solution; and determine, for each of the at least one query solution, a query overhead corresponding to the query solution based on a query overhead value of a storage file involved in the query solution, wherein the storage file involved in the query solution comprises a target storage file, and the query overhead value of the target storage file is determined based on a storage system corresponding to the target storage file, wherein the target storage file comprises at least one dimension of indicator, the query overhead value of the target storage file is equal to a sum of query overhead values corresponding to each indicator, and the query overhead value of each indicator is equal to a product of a statistical value corresponding to the indicator and a weight of the indicator, wherein the weight respectively corresponding to each of the at least one dimension of indicator is determined based on the storage system corresponding to the target storage file, and wherein the target parameter comprises a third parameter, and the processor is further caused to:

match the index parameter and the target parameter with the correspondence respectively, to obtain a fourth storage file that stores the index parameter and an intermediate parameter, and a fifth storage file that stores the intermediate parameter and the third parameter;

obtain a fourth query solution based on the fourth storage file and the fifth storage file, wherein the fourth query solution indicates to first query the fourth storage file based on the index parameter, and then query the fifth storage file based on the intermediate parameter obtained by querying the fourth storage file, to obtain the third parameter;

determine storage files which are involved in the query solution;

generate the query statement corresponding to each of storage files based on each of the storage files which are involved in the query solution, query input corresponding to a storage file, query result corresponding to the storage file, and a query statement format supported by each of the storage files which are involved in the query solution, wherein the query input comprises the index parameter for querying the fourth storage file and the intermediate parameter for querying the fifth query file, and the query result comprises the intermediate parameter obtained by querying the fourth storage file and the third parameter obtained by querying the fifth query file; and execute the query statement to query based on a query order of the fourth storage file and the fifth query file and obtain the target parameter.

8. The non-transitory computer-readable storage medium according to claim 7, wherein the processor is further caused to:

match the index parameter and the target parameter with the correspondence respectively, to obtain a plurality of storage files that each store both the index parameter and the target parameter, and determine the plurality of storage files as the to-be-queried storage file; and determine a query solution corresponding to each of the plurality of storage files respectively.

9. The non-transitory computer-readable storage medium according to claim 7, wherein the target parameter comprises a first parameter and a second parameter, and the processor is further caused to:

match the index parameter and the target parameter with the correspondence respectively, to obtain a first storage file, a second storage file, and a third storage file, wherein the first storage file stores the index parameter and the first parameter, the second storage file stores the index parameter and the second parameter, and the third storage file stores the index parameter, the first parameter, and the second parameter; and obtain a first query solution and a second query solution based on the first storage file, the second storage file, and the third storage file, wherein the first query solution indicates to query and obtain the target parameter based on the first storage file and the second storage file, and the third query solution indicates to query and obtain the target parameter based on the third storage file.

* * * * *